US008910685B2

(12) United States Patent
Domingo et al.

(10) Patent No.: US 8,910,685 B2
(45) Date of Patent: Dec. 16, 2014

(54) TIRE FOR HEAVY-GOODS VEHICLE

(75) Inventors: Alain Domingo, Orleat (FR); Philippe Johnson, Perignat sur Allier (FR)

(73) Assignees: Michelin Recherche et Techniques S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 1062 days.

(21) Appl. No.: 12/600,429

(22) PCT Filed: May 13, 2008

(86) PCT No.: PCT/EP2008/055849
§ 371 (c)(1),
(2), (4) Date: Nov. 16, 2009

(87) PCT Pub. No.: WO2008/141979
PCT Pub. Date: Nov. 27, 2008

(65) Prior Publication Data
US 2010/0147438 A1    Jun. 17, 2010

(30) Foreign Application Priority Data
May 14, 2007  (FR) ...................... 07 03507

(51) Int. Cl.
*B60C 9/22*  (2006.01)
*B60C 9/28*  (2006.01)
*B60C 9/20*  (2006.01)

(52) U.S. Cl.
CPC ........... *B60C 9/28* (2013.01); *B60C 2009/2242* (2013.01); *B60C 9/22* (2013.01); *B60C 9/2006* (2013.01); *D07B 2401/208* (2013.01)
USPC .......................................... 152/531; 152/451

(58) Field of Classification Search
CPC ....................................................... B60C 9/22
USPC ..................................... 152/451, 531
See application file for complete search history.

(56) References Cited

U.S. PATENT DOCUMENTS

| 4,258,543 | A | * | 3/1981 | Canevari et al. | 57/212 |
| 4,293,019 | A | * | 10/1981 | Maiocchi | 152/527 |
| 4,928,742 | A | * | 5/1990 | Oku et al. | 152/534 |
| 5,205,881 | A | * | 4/1993 | Kohno et al. | 152/527 |
| 5,746,853 | A | * | 5/1998 | Burlacot | 152/531 |
| 5,795,417 | A | * | 8/1998 | Damke et al. | 152/527 |
| 6,089,293 | A | * | 7/2000 | Niderost | 152/527 |
| 6,367,527 | B1 | * | 4/2002 | Cluzel | 152/527 |
| 6,994,138 | B2 | * | 2/2006 | Chaylard | 152/531 |
| 2006/0169383 | A1 | * | 8/2006 | Radulescu et al. | 152/538 |

FOREIGN PATENT DOCUMENTS

| EP | 0 582 196 | 7/1993 |
| EP | 1 122 098 | 8/2001 |
| FR | 1 389 428 | 7/1963 |

(Continued)

*Primary Examiner* — Justin Fischer
*Assistant Examiner* — Robert Dye
(74) *Attorney, Agent, or Firm* — Cozen O'Connor

(57) ABSTRACT

A tire comprising at least two working layers and at least one layer of reinforcing elements. The layer of circumferential reinforcing elements comprises at least a central part and two axially exterior parts, the extent to which the circumferential reinforcing elements of the central part are penetrated by the rubber compound with which they are coated being less than the extent to which the circumferential reinforcing elements of the axially exterior parts are penetrated by the rubber compound with which they are coated.

22 Claims, 4 Drawing Sheets

(56) References Cited

FOREIGN PATENT DOCUMENTS

| FR | 2 222 232 | 10/1974 |
| FR | 2 728 510 | 6/1996 |
| FR | 2 857 619 | 1/2005 |
| GB | 1 462 656 | 1/1977 |
| JP | 7-47806 | * 2/1995 |
| WO | WO 99/24269 | 5/1999 |
| WO | WO 00/69659 | 11/2000 |

* cited by examiner

TIRE FOR HEAVY-GOODS VEHICLE

RELATED APPLICATIONS

This is a U.S. national stage under 35 USC §371 of application No. PCT/EP2008/055849, filed on May 13, 2008.

This application claims the priority of French application Ser. No. 07/03507 filed May 14, 2007, the entire content of which is hereby incorporated by reference.

FIELD OF THE INVENTION

The present invention relates to a tire with a radial carcass reinforcement, and more particularly to a tire intended to be fitted to vehicles that carry heavy loads and drive at sustained speeds, such as, for example, lorries, tractors, trailers, or road buses.

BACKGROUND OF THE INVENTION

The reinforcing structure or reinforcement of tires, particularly of tires for vehicles of the heavy vehicle type, is currently—and usually—made up of a stack of one or more plies conventionally known as "carcass plies", "crown plies", etc. This way of naming the reinforcements stems from the method of manufacture, which involves creating a series of semi-finished products in the form of plies, provided with thread-like reinforcements, often longitudinal, which are then assembled or stacked in order to build a green tire. The plies are produced flat, with substantial dimensions, and are then cut to the dimensions of a given product. The plies are also initially assembled substantially flat. The green tire thus produced is then shaped to adopt the toroidal profile typical of tires. The semi-finished "finishing" products are then applied to the green tire in order to obtain a product ready to be cured.

A "conventional" type of method such as this involves, particularly during the phase of manufacturing the green tire, the use of an anchoring element (generally a bead wire) which is used to anchor or retain the carcass reinforcement in the bead region of the tire. Thus, for this type of method, a portion of all the plies that make up the carcass reinforcement (or just some of them) is folded back around a bead wire positioned in the bead of the tire. That then anchors the carcass reinforcement in the bead.

The widespread use across industry of this conventional type of method, in spite of there being numerous variations in how the plies are created and assembled, has led those skilled in the art to adopt a vocabulary based on the method; hence the terminology generally used, involving in particular the terms "plies", "carcass", "bead wire", "shaping" to denote the transition from a flat profile to a toroidal profile, etc.

Nowadays there are tires which do not strictly speaking have "plies" or "bead wires" as understood from the above definitions. For example, document EP 0 582 196 describes tires manufactured without the aid of semi-finished products in the form of plies. For example, the reinforcing elements of the various reinforcing structures are applied directly to the adjacent layers of rubber compounds, everything being applied in successive layers to a toroidal core, the shape of which directly yields a profile similar to the final profile of the tire that is in the process of being manufactured. Thus, in this case, there are no longer any "semi-finished" products or "plies", or "bead wires". The basic products such as the rubber compounds and the reinforcing elements in the form of threads or filaments are applied directly to the core. As this core is of a toroidal shape, there is no longer any need to form the green tire in order to change from a flat profile to a profile in the form of a torus.

Furthermore, the tires described in that document do not use the "traditional" turning back of the carcass ply around a bead wire. That type of anchorage is replaced by an arrangement in which circumferential threads are positioned adjacent to the said sidewall reinforcing structure, everything being embedded in an anchoring or bonding rubber compound.

There are also methods of assembly on a toroidal core that employ semi-finished products specially designed for rapid, effective and simple laying onto a central core. Finally, it is also possible to use a hybrid comprising both certain semi-finished products for achieving certain architectural aspects (such as plies, bead wires etc.), while others are created by applying compounds and/or reinforcing elements directly.

In this document, in order to take account of recent technological advances both in the field of manufacture and in the design of the products, the conventional terms such as "plies", "bead wires", etc., are advantageously replaced by terms which are neutral or independent of the type of method used. Hence, the term "carcass type reinforcement" or "sidewall reinforcement" can validly be used to denote the reinforcing elements of a carcass ply in the conventional method, and the corresponding reinforcing elements, generally applied to the sidewalls, of a tire produced according to a method that does not involve semi-finished products. The term "anchoring zone" for its part, can just as easily denote the "traditional" turning back of the carcass ply around a bead wire in a conventional method as it can the assembly formed by the circumferential reinforcing elements, the rubber compound and the adjacent sidewall reinforcing portions of a bottom region created using a method which involves applying elements to a toroidal core.

In general, in tires of the heavy vehicle tire type, the carcass reinforcement is anchored on each side in the region of the bead and is surmounted radially by a crown reinforcement, constituted by at least two layers that are superposed and formed of threads or cords which are parallel within each layer and crossed from one layer to the next making with the circumferential direction angles comprised between 10° and 45°. The said working layers, that form the working reinforcement, may also be covered by at least one so-called protective layer formed of reinforcing elements, which are advantageously metal and extensible, known as elastic reinforcing elements. It may also comprise a layer of metal cords or threads with low extensibility, that make an angle comprised between 45° and 90° with the circumferential direction, this ply, known as a bracing ply, being situated radially between the carcass reinforcement and the first so-called working crown ply, formed of parallel cords or threads at angles of at most 45° in terms of absolute value. The bracing ply forms, with at least the said working ply, a triangulated reinforcement which, under the various stresses that it experiences, undergoes very little deformation, the essential role of the bracing ply being to react transverse compressive forces to which all of the reinforcing elements are subjected in the region of the crown of the tire.

In the case of heavy vehicle tires, a single protective layer is usually present and its protective elements are, mostly, oriented in the same direction and at the same angle in terms of absolute value as those of the reinforcing elements of the radially outermost and therefore radially adjacent working layer. In the case of engineering works vehicle tires intended to run on somewhat uneven ground, the presence of two protective layers is advantageous, the reinforcing elements being crossed from one layer to the next and the reinforcing elements of the radially interior protective layer being crossed with the inextensible reinforcing elements of the working layer that is radially exterior and adjacent to the said radially interior protective layer.

Cords are said to be inextensible when the said cords have, under a tensile force equal to 10% of the breaking strength, a relative elongation of 0.2% at most.

Cords are said to be elastic when the said cords have, under a tensile force equal to the breaking strength, a relative elongation at least equal to 3% with a maximum tangent modulus of less than 150 GPa.

Circumferential reinforcing elements are reinforcing elements which make, with the circumferential direction, angles comprised in the range +2.5°, −2.5° about 0°.

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it revolves under normal use.

A radial or meridian plane is a plane containing the axis of rotation of the tire.

The circumferential median plane or equatorial plane is a plane perpendicular to the axis of rotation of the tire and which divides the tire into two halves.

What is meant by the "elastic modulus" of a rubber compound is a secant tensile modulus at 10% deformation and ambient temperature.

As far as the rubber compounds are concerned, modulus measurements are carried out under tension in accordance with AFNOR-NFT-46002, September 1988: the nominal secant modulus (or apparent stress, in MPa) is measured in second elongation (i.e. after an accommodating cycle) at 10% elongation (standard temperature and hygrometry conditions in accordance with AFNOR-NFT-40101, December 1979).

As far as the metal threads or cords are concerned, the measurements of load at break (maximum load in N), strength at break (in MPa) and elongation at break (total elongation in %) are performed under tension in accordance with ISO 6892, 1984.

Some present-day tires, known as "road" tires, are intended to run at high speed and over increasingly long distances, because of the improvements to the road network and the expansion of the motorway network worldwide. Although all of the conditions under which a tire is called upon to run undoubtedly allows an increase in the number of kilometers covered, because tire wear is lower, this is at the expense of tire durability, particularly of crown reinforcement durability.

The issue is that there are stresses in the crown reinforcement and more particularly shear stresses between the crown layers, combined with a not insignificant increase in operating temperature at the ends of the axially shortest crown layer, which result in the appearance and propagation of cracks in the rubber at the said ends. The same problem exists in the case of edges of two layers of reinforcing elements, the said other layer not necessarily being radially adjacent to the first.

To improve the endurance of the crown reinforcement of the type of tire being studied, solutions relating to the structure and quality of the layers and/or profiles of rubber compounds which are positioned between and/or around the ends of plies and, more particularly, the ends of the axially shortest ply, have already been applied.

Patent FR 1 389 428, in order to increase the resistance to damage of the rubber compound situated near the edges of the crown reinforcement, recommends the use, in combination with a low-hysteresis tread, of a rubber profile covering at least the sides and the marginal edges of the crown reinforcement and consisting of a low-hysteresis rubber compound.

Patent FR 2 222 232, in order to avoid separation between crown reinforcement plies, teaches the coating of the ends of the reinforcement in a rubber mat, the Shore A hardness of which differs from that of the tread surmounting the said reinforcement, and is higher than the Shore A hardness of the profile of rubber compound positioned between the edges of crown reinforcing plies and carcass reinforcement.

French application FR 2 728 510 proposes positioning, on the one hand, between the carcass reinforcement and the crown reinforcement working ply radially closest to the axis of rotation, an axially continuous ply formed of inextensible metal cords that make an angle of at least 60° with the circumferential direction and the axial width of which is at least equal to the axial width of the shortest working crown ply and, on the other hand, between the two working crown plies, an additional ply formed of metal elements directed substantially parallel to the circumferential direction.

Prolonged running of the tires thus constructed under particularly harsh conditions has revealed limits in terms of the endurance of these tires.

To remedy such disadvantages and improve the endurance of the crown reinforcement of these tires, it has been proposed that there be associated with the angle working crown layers at least one additional layer of reinforcing elements substantially parallel to the circumferential direction. French application WO 99/24269 proposes, notably, on each side of the equatorial plane and in the immediate axial continuation of the additional ply of reinforcing elements substantially parallel to the circumferential direction, that the two working crown plies formed of reinforcing elements that are crossed from one ply to the next be coupled over a certain axial distance and then decoupled by profiles of rubber compound at least over the remainder of the width common to the said two working plies.

The layer of circumferential reinforcing elements usually consists of at least one metal cord wound to form a spiral laid at an angle of less than 8° with respect to the circumferential direction. The cords initially manufactured are coated with a rubber compound before being laid. This rubber compound then penetrates the cord under the effect of the pressure and the temperature when the tire is cured. The coating of the cords with the rubber compound may be performed in an intermediate phase between manufacturing the cord and laying it to be stored in the form of a reel. An alternative form of manufacture is to coat the cords with the rubber compound at the same time as or, more precisely, just before, the said cords are laid.

The results obtained in terms of endurance and wear during prolonged running on high-speed routes are satisfactory. Nonetheless, it has emerged that the same vehicle sometimes have to drive along roads or tracks that are not paved with asphalt, for example in order to reach a work site or get to an unloading zone. Running in these zones is done at low speed but the tires, particularly their treads, are subject to attack, for example because of the presence of stones which are extremely detrimental to performance in terms of tire wear.

SUMMARY OF THE INVENTION

It is an object of the invention to provide tires for "heavy vehicles", the endurance and wear performance of which is maintained for road use and the wear performance of which is improved for use on ground that is not paved with asphalt.

This object is achieved, according to an aspect of the invention, by a tire with a radial carcass reinforcement comprising a crown reinforcement formed of at least two working crown layers of inextensible reinforcing elements, crossed from one layer to the other making angles of between 10° and 45° with the circumferential direction, itself radially capped by a tread, the tread being connected to two beads via two sidewalls, the crown reinforcement comprising at least one layer of circumferential reinforcing elements, the layer of circumferential reinforcing elements comprising at least a central part and two axially exterior parts, and the extent to which the circumferential reinforcing elements of the central part are penetrated by the rubber compound with which they are coated being less than the extent to which the circumferential reinforcing elements of the axially exterior parts are penetrated by the rubber compound with which they are coated.

The degree of penetration of the reinforcing elements with a rubber compound according to an embodiment of the invention means the degree of penetration of a rubber compound in the free zones of a cord, that is to say those zones that contain no material; it is expressed as a percentage of the said free zones occupied by a rubber compound after curing and is determined by an air-permeability test.

This air-permeability test makes it possible to measure a relative air-permeability index. It is a simple means of indirectly measuring the degree of penetration of the cord with a rubber compound. It is performed on cords extracted directly, by excision, from the plies of vulcanized rubber that they reinforce, and which have therefore been penetrated with the cured rubber compound.

The test is performed on a determined length of cord (for example 2 cm) as follows: air is sent to the start of the cord, at a given pressure (for example 1 bar), and the amount of air at the end is measured using a flow meter; during measuring, the specimen of cord is immobilized in a sealed gasket so that only the amount of air that passes through the cord from one end to the other along its longitudinal axis is taken into consideration in the measurement. The higher the degree of penetration of the cord by the rubber compound, the lower the measured flow rate.

According to one preferred embodiment of the invention, the extent to which the circumferential reinforcing elements of the central part are penetrated by the rubber compound with which they are coated is at least 30% less than the extent to which the circumferential reinforcing elements of the axially exterior parts are penetrated by the rubber compound with which they are coated.

For preference, the extent to which the circumferential reinforcing elements of the axially exterior parts are penetrated by the rubber compound with which they are coated is greater than 90%.

Again for preference, the extent to which the circumferential reinforcing elements of the central part are penetrated by the rubber compound with which they are coated is less than 60%.

To create such a layer of circumferential reinforcing elements it is possible to use different cords initially coated or alternatively cords coated as they are laid. In the latter alternative form of embodiment, it may be a single cord the coating rubber compound of which is varied or alternatively may be a complete change of the cord-laying device leading to the laying of different cords containing different coating rubber compounds.

In order to obtain different penetrations of the rubber compound in the different parts of the layer of circumferential reinforcing elements, the inventors are, for example, proposing to limit the penetration of a given rubber compound by causing the rubber compound to vulcanize or at least to begin to vulcanize before the reinforcing element is laid. This vulcanizing or start of vulcanizing may be obtained by rapidly raising the temperature of the rubber compound for a short space of time. This step of raising the temperature is, for example, performed immediately after the cord has been coated with the rubber compound. When a coated cord has undergone such a treatment, the penetration of the rubber compound within the cord when the tire is cured is greatly limited if not nonexistent.

The tire thus defined according to an embodiment of the invention maintains satisfactory properties when running at high speeds on roads and also has performance in terms of resistance to wear and more specifically in terms of resistance to attack that is markedly improved over known tires.

The inventors have in fact been able to demonstrate that the attacks that occur on land that is not paved with asphalt essentially affect the central part of the tread of the tire, the latter seemingly always being the most exposed.

The tire as defined according to an embodiment of the invention leads to a softening in the radial direction of the axially central part of the tire because in particular the low rigidity of the circumferential reinforcing elements of this central zone of the tire which is associated with the penetration of the rubber compounds with which the circumferential reinforcing elements are coated in the various axial parts. This softening leads, in view of the results obtained, to the tread absorbing the attacks from obstacles such as stones present on the ground over which the vehicle is driving.

The rigidity of the reinforcing elements in the central part remains sufficient to provide the tire with sufficient belting in this central part such that the tire is able to withstand the stresses applied particularly during inflation or when running at high speed, and to limit the circumferential expansion of the crown reinforcement.

According to an advantageous embodiment of the invention, the elastic modulus of the rubber compound with which the circumferential reinforcing elements of the central part are coated is less than the modulus of the rubber compound with which the circumferential reinforcing elements of the axially exterior parts are coated.

This alternative form of embodiment of the invention combines elastic moduli of the rubber compounds with which the circumferential reinforcing elements are coated with different penetrations of the rubber compounds with which the circumferential reinforcing elements are coated in the various axial parts. The lower modulus of the rubber compound coating the circumferential reinforcing elements in the central part associated with lower penetration of the said rubber compound further accentuates the lower rigidity of the circumferential reinforcing elements of the central part by comparison with that of the circumferential reinforcing elements of the axially exterior parts.

According to an advantageous alternative form of embodiment of the invention, the layer of circumferential reinforcing elements has an axial width greater than 0.5×S.

S is the maximum axial width of the tire when the latter is mounted on its service rim and inflated to its recommended pressure.

The axial widths of the layers of reinforcing elements are measured on a cross section of a tire, the tire therefore being in an uninflated state.

According to a preferred alternative form of embodiment of the invention, the axial width of the central part of the layer of circumferential reinforcing elements is greater than 0.15×S and less than 0.5×S.

Advantageously again according to the invention, the axial width of each of the axially exterior parts of the layer of circumferential reinforcing elements is less than 0.45×S.

An embodiment of the invention advantageously has it that at least one layer that makes up the crown architecture is present radially under the axially outermost "rib" or chiefly longitudinally directed pattern. This embodiment, as previously mentioned, improves the rigidity of the said pattern. Advantageously also, the layer of circumferential reinforcing elements is present radially under the axially outermost "rib" or chiefly longitudinally directed pattern.

According to a preferred embodiment of the invention, at least two working crown layers have different axial widths, the difference between the axial width of the axially widest working crown layer and the axial width of the axially least wide working crown layer being comprised between 10 and 30 mm.

Preferably too, the axially widest working crown layer is radially on the interior of the other working crown layers.

According to a preferred embodiment of the invention, the layer of circumferential reinforcing elements is positioned radially between two working crown layers.

Advantageously too according to an embodiment of the invention, the axial widths of the working crown layers radially adjacent to the layer of circumferential reinforcing elements are greater than the axial width of the said layer of circumferential reinforcing elements and, for preference, the said working crown layers adjacent to the layer of circumferential reinforcing elements are on each side of the equatorial plane and in the immediate axial continuation of the layer of circumferential reinforcing elements coupled over an axial width in order thereafter to be decoupled by profiles of rubber compound at least over the remainder of the width common to the said two working layers.

Within the meaning of an embodiment of the invention, coupled layers are layers the respective reinforcing elements of which are radially separated by 1.5 mm at most, the said thickness of rubber being measured radially between the respectively upper and lower generatrices of the said reinforcing elements.

The presence of such couplings between the working crown layers adjacent to the layer of circumferential reinforcing elements allows a reduction in the tensile stresses acting on the axially outermost circumferential elements situated closest to the coupling.

The thickness of the inter-working ply decoupling profiles, measured in line with the ends of the least wide working ply, will be equal to at least two millimeters and preferably greater than 2.5 mm.

According to an advantageous embodiment of the invention, the reinforcing elements of at least one layer of circumferential reinforcing elements are metal reinforcing elements with a secant modulus at 0.7% elongation comprised between 10 and 120 GPa and a maximum tangent modulus of less than 150 GPa.

According to a preferred embodiment, the secant modulus of the reinforcing elements at 0.7% elongation is less than 100 GPa, and greater than 20 GPa, preferably comprised between 30 and 90 GPa and more preferably still less than 80 GPa.

Again as a preference, the maximum tangent modulus of the reinforcing elements is less than 130 GPa and preferably less than 120 GPa.

The moduli expressed hereinabove are measured on a curve of tensile stress as a function of elongation determined with a preload of 20 MPa brought down to the cross section of metal of the reinforcing element, the tensile stress corresponding to a measured tension brought down to the cross section of metal of the reinforcing element.

The moduli of the same reinforcing elements can be measured on a curve of tensile stress as a function of elongation determined with a preload of 10 MPa brought down to the overall cross section of the reinforcing element, the tensile stress corresponding to a measured tension brought down to the overall cross section of the reinforcing element. The overall cross section of the reinforcing element is the cross section of a composite element made of metal and of rubber, the latter notably having penetrated the reinforcing element during the tire curing phase.

According to this formulation, relating to the overall cross section of the reinforcing element, the reinforcing elements of the axially exterior parts and of the central part of at least one layer of circumferential reinforcing elements are metal reinforcing elements with a secant modulus at 0.7% elongation comprised between 5 hand 60 GPa with a maximum tangent modulus of less than 75 GPa.

According to a preferred embodiment, the secant modulus of the reinforcing elements at 0.7% elongation is less than 50 GPa and greater than 10 GPa, preferably comprised between 15 and 45 GPa and more preferably still, less than 40 GPa.

Preferably also, the maximum tangent modulus of the reinforcing elements is less than 65 GPa and more preferably still, less than 60 GPa.

According to a preferred embodiment, the reinforcing elements of at least one layer of circumferential reinforcing elements are metal reinforcing elements having a curve of tensile stress as a function of relative elongation with shallow gradients for short elongations and a substantially constant and steep gradient for higher elongations. Such reinforcing elements of the additional ply are usually known as "bi-modulus" elements.

According to a preferred embodiment of the invention, the substantially constant and steep gradient appears from above a relative elongation comprised between 0.1% and 0.5%.

The various abovementioned characteristics of the reinforcing elements are measured on reinforcing elements taken from tires.

Reinforcing elements more particularly suited to creating at least one layer of circumferential reinforcing elements according to the invention are, for example, assemblies of the formula 21.23, the construction of which is 3×(0.26+6×0.23) 4.4/6.6 SS; this stranded cord being made up of 21 elementary threads of formula 3×(1+6), with 3 twisted-together strands each made up of 7 threads, one thread forming a central core of a diameter equal to $26/100$ mm, and 6 wound threads of diameter equal to $23/100$ mm. A cord such as this has a secant modulus at 0.7% equal to 45 GPa and a maximum tangent modulus equal to 98 GPa, measured on a curve of tensile stress as a function of elongation determined with a preload of 20 MPa brought down to the cross section of metal of the reinforcing element, the tensile stress corresponding to a measured tension brought down to the cross section of metal of the reinforcing element. On a curve of tensile stress as a function of elongation determined with a preload of 10 MPa brought down to the overall cross section of the reinforcing element, the tensile stress corresponding to a measured tension brought down to the overall cross section of the reinforcing element, this cord of formula 21.23 has a secant modulus at 0.7% equal to 23 GPa and a maximum tangent modulus equal to 49 GPa.

Likewise, another example of reinforcing elements is an assembly of formula 21.28, the construction of which is 3×(0.32+6×0.28) 6.2/9.3 SS. This cord has a secant modulus at 0.7% equal to 56 GPa and a maximum tangent modulus equal to 102 GPa, both measured on a curve of tensile stress as a function of elongation determined with a preload of 20 MPa brought down to the cross section of metal of the reinforcing element, the tensile stress corresponding to a measured tension brought down to the cross section of metal of the reinforcing element. On a curve of tensile stress as a function of elongation determined with a preload of 10 MPa brought down to the total cross section of the reinforcing element, the tensile stress corresponding to a measured tension brought down to the overall cross section of the reinforcing element, this cord of formula 21.28 has a secant modulus of 0.7% equal to 27 GPa and a maximum tangent modulus equal to 49 GPa.

The use of such reinforcing elements in at least one layer of circumferential reinforcing elements makes it possible in particular to maintain satisfactory layer rigidities even after the shaping and curing steps in conventional manufacturing methods.

According to a second embodiment of the invention, the circumferential reinforcing elements may be formed of inextensible metal elements cut in such a way as to form portions of a length very much shorter than the circumference of the least long layer, but preferably greater than 0.1 times the said circumference, the cuts between portions being axially offset from one another. Preferably also, the elastic modulus in tension per unit width of the additional layer is less than the elastic modulus in tension, measured under the same conditions, of the most extensible working crown layer. An embodiment such as this makes it possible, in a simple way, to give the layer of circumferential reinforcing elements a modulus that can easily be adjusted (through the choice of spacing between portions of one and the same row), but which is in all cases lower than the modulus of the layer made up of the same metal elements but continuous ones, the modulus of the additional layer being measured on a vulcanized layer of cut elements taken from the tire.

According to a third embodiment of the invention, the circumferential reinforcing elements are wavy metal reinforcing elements, the ratio $a/\lambda$ of the amplitude of the wave to the wavelength being at most equal to 0.09. For preference, the elastic modulus in tension per unit width of the additional layer is less than the elastic modulus in tension, measured under the same conditions, of the most extensible working crown layer.

The metal elements are preferably steel cords.

In order to reduce the tensile stresses acting on the axially outermost circumferential elements, an embodiment of the invention advantageously has it that the angle formed with the circumferential direction by the reinforcing elements of the working crown layers is less than 30° and preferably less than 25°.

According to another advantageous alternative form of embodiment of the invention, the working crown layers comprise reinforcing elements that are crossed from one ply to the other, making with the circumferential direction angles that vary according to the axial direction, the said angles being greater on the axially outer edges of the layers of reinforcing elements with respect to the angles of the said elements measured at the circumferential mid-plane. Such an embodiment of the invention makes it possible to increase the circumferential rigidity in certain zones while on the other hand reducing it in others, notably in order to reduce the compression of the carcass reinforcement.

A preferred embodiment of the invention also has it that the crown reinforcement is supplemented radially on the outside by at least one additional ply, known as a protective ply, of so-called elastic reinforcing elements, oriented with respect to the circumferential direction at an angle comprised between 10° and 45° and of the same direction as the angle formed by the inextensible elements of the working ply radially adjacent to it.

The protective layer may have an axial width smaller than the axial width of the least wide working layer. The said protective layer may also have an axial width greater than the axial width of the least wide working layer, such that it overlaps the edges of the least wide working layer and, when it is the radially uppermost layer that is the least wide, such that it is coupled, in the axial continuation of the additional reinforcement, with the widest working crown layer over an axial width in order thereafter, axially on the exterior, to be decoupled from the said widest working layer by profiles at least 2 mm thick. The protective layer formed of elastic reinforcing elements may, in the abovementioned case, on the one hand, possibly be decoupled from the edges of the said least wide working layer by profiles of a thickness appreciably smaller than the thickness of the profiles that separate the edges of the two working layers and, on the other hand, have an axial width less than or greater than the axial width of the widest crown layer.

According to any one of the aforementioned embodiments of the invention, the crown reinforcement may also be supplemented, radially on the inside between the carcass reinforcement and the radially inner working layer closest to the said carcass reinforcement, by a bracing layer of inextensible metal reinforcing elements made of steel that make an angle greater than 60° with the circumferential direction in the same direction as the angle formed by the reinforcing elements of the radially closest carcass reinforcement layer.

BRIEF DESCRIPTION OF THE DRAWINGS

Other details and advantageous features of the invention will emerge hereinafter from the description of some exemplary embodiments of the invention, with reference to FIGS. 1 to 4 which depict.

DETAILED DESCRIPTION OF THE DRAWINGS

In order to make them easier to understand, the figures are not drawn to scale. The figures depict only half a view of a tire which continues symmetrically with respect to the axis XX' which represents the circumferential mid-plane or equatorial plane of a tire.

Figure 1:
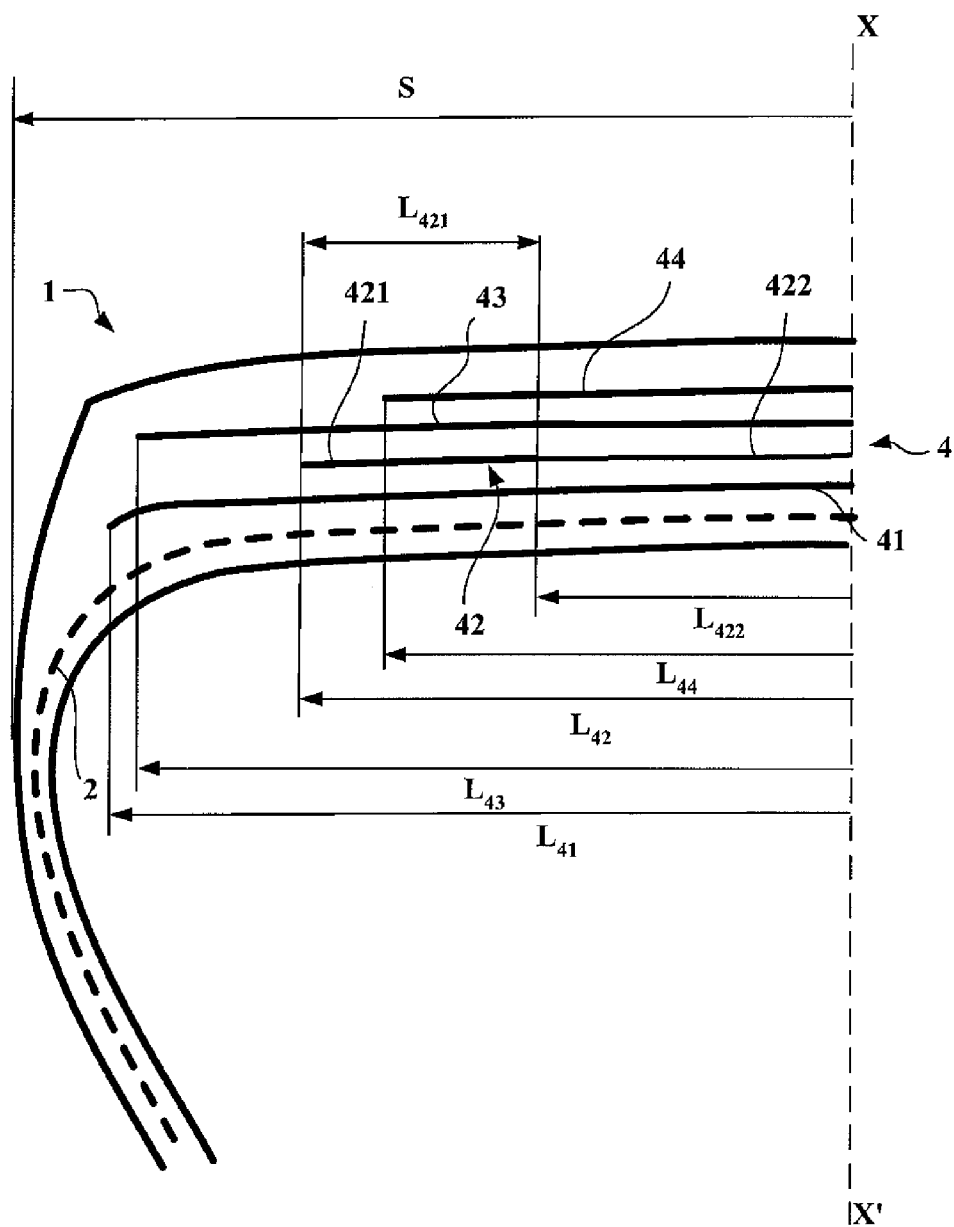
FIG. 1: a meridian view of a diagram of a tire according to one embodiment of the invention.

In FIG. 1, the tire 1, of the size 315/60 R 22.5, has an aspect ratio H/S equal to 0.60, H being the height of the tire 1 on its mounting rim and S is the maximum axial width. The said tire 1 comprises a radial carcass reinforcement 2 anchored in two beads, not depicted in the figure. The carcass reinforcement is formed of a single layer of metal cords. This carcass reinforcement 2 is belted by a crown reinforcement 4, formed radially from the inside outwards:

of a first working layer 41 formed of unbelted inextensible 11.35 metal cords which are continuous across the entire width of the ply and directed at an angle equal to 18°, of a layer of circumferential reinforcing elements 42 formed of steel 21×28 metal cords, of "bi-modulus"

type, made up of three parts these being two axially exterior parts 421 and one central part 422, of a second working layer 43 formed of unbelted inextensible 11.35 metal cords which are continuous across the entire width of the ply, directed at an angle of 26° and crossing with the metal cords of the layer 41, of a protective layer 44 formed of 18×23 elastic metal cords.

The crown reinforcement is itself capped by a tread 6.

The maximum axial width S of the tire is equal to 319 mm.

The axial width $L_{41}$ of the first working layer 41 is equal to 260 mm.

The axial width $L_{43}$ of the second working layer 43 is equal to 245 mm. The difference between the widths $L_{41}$ and $L_{43}$ is equal to 15 mm.

As for the overall axial width $L_{42}$ of the layer of circumferential reinforcing elements 42, it is equal to 200 mm, each of the axially exterior parts 421 having an axial width $L_{421}$ equal to 50 mm and therefore less than 45% of S.

The width of the central part $L_{422}$ is equal to 100 mm.

The final crown ply 44 known as the protective ply has a width $L_{44}$ equal to 180 mm.

The rubber compound with which the 21×28 steel metal cords of the layer 42 are coated has a modulus equal to 10 MPa. The rubber compound is the same in the central part 422 and in the axially exterior parts 421.

The degree of penetration of the reinforcing elements of the central part 422 is equal to 30%.

The degree of penetration of the reinforcing elements of the axially exterior parts 421 is equal to 95%.

Figure 2:
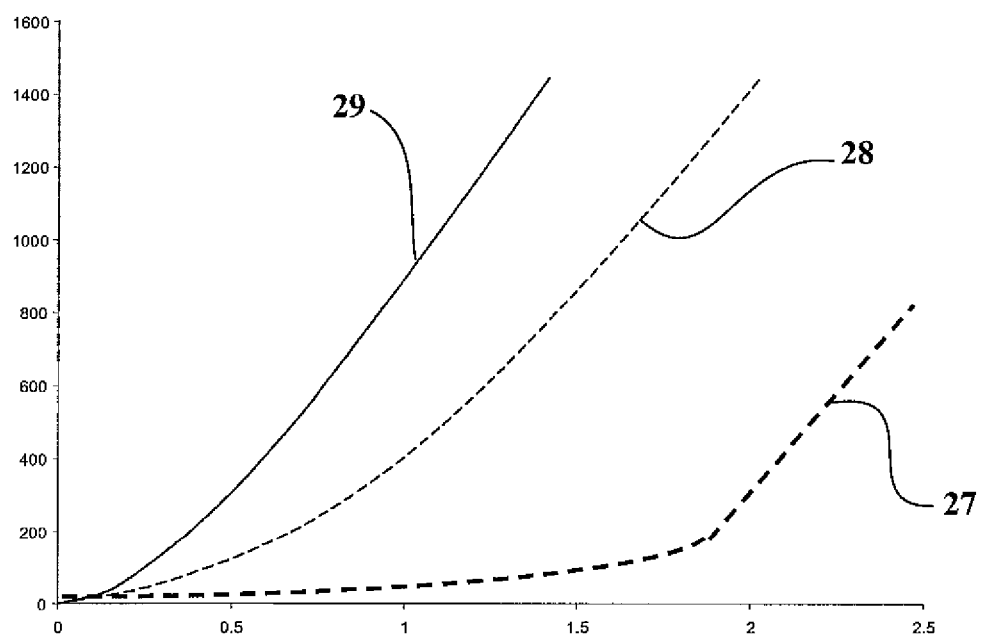
FIG. 2: a diagram illustrating curves of tensile force as a function of elongation for different cables.

FIG. 2 illustrates curves showing, on the ordinate axis, the tensile force, expressed in Newtons, and, on the abscissa axis, the elongation, expressed in millimeters, for the 21×28 cord, of the layer of circumferential reinforcing elements 42 bare and coated with the various compounds.

Measurements for cords coated with compound were taken from cords extracted from the tire and therefore after the tire had been cured, the compounds therefore having penetrated the cords.

Curve 27 represents the curve of tensile force as a function of elongation for the bare 21×28 cord. Curve 28 represents the curve of tensile force as a function of elongation for the 21×28 cord coated with a rubber compound and extracted from the central part 422 of the layer of circumferential reinforcing elements 42. Curve 29 represents the curve of tensile force as a function of elongation for the 21×28 cord coated with a rubber compound and extracted from one of the axially exterior parts 421 of the layer of circumferential reinforcing elements 42.

These curves show that the presence of the rubber compound coating the metal cord contributes to increasing the rigidity of the cord, on the one hand, the structural elongation of the cord being lower and, on the other hand, the maximum tangent modulus increasing. Further, these curves also show that the reduction in structural elongation and the increase in maximum tangent modulus of a given cord increase with the degree of penetration of the rubber compound with which the said cord is coated.

Figure 3:
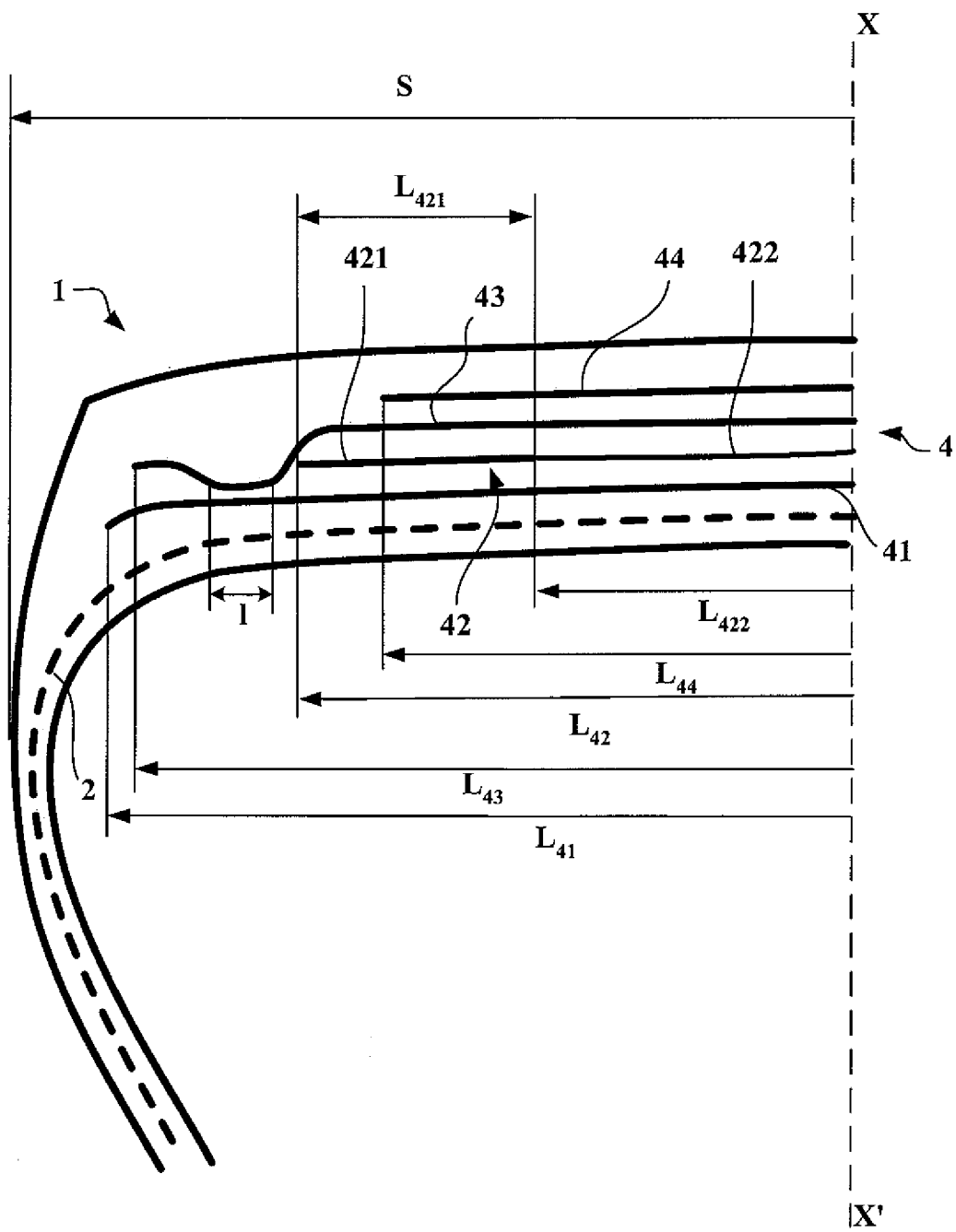
FIG. 3: a meridian view of a diagram of a tire according to a second embodiment of the invention.

In FIG. 3, the tire 1 differs from the one depicted in FIG. 1 in that the two working layers 41 and 43 are, on each side of the equatorial plane and axially in the continuation of the layer of circumferential reinforcing elements 42, coupled over an axial width 1: the cords of the first working layer 41 and the cords of the second working layer 43, over the axial width 1 of coupling of the two layers, are radially separated from one another by a layer of rubber, the thickness of which is minimal and corresponds to twice the thickness of the rubbery layer calendered on to the unbelted 11.35 metal cords of which each working layer 41, 43 is formed, namely 0.8 mm. Over the remaining width common to the two working layers, the two working layers 41, 43 are separated by a rubber profile, not depicted in the figure, the thickness of the said profile increasing from the axial end of the coupling zone towards the end of the least wide working layer. The said profile advantageously is wide enough radially to overlap the end of the widest working layer 41 which, in this case, is the working layer radially closest to the carcass reinforcement.

Figure 4:
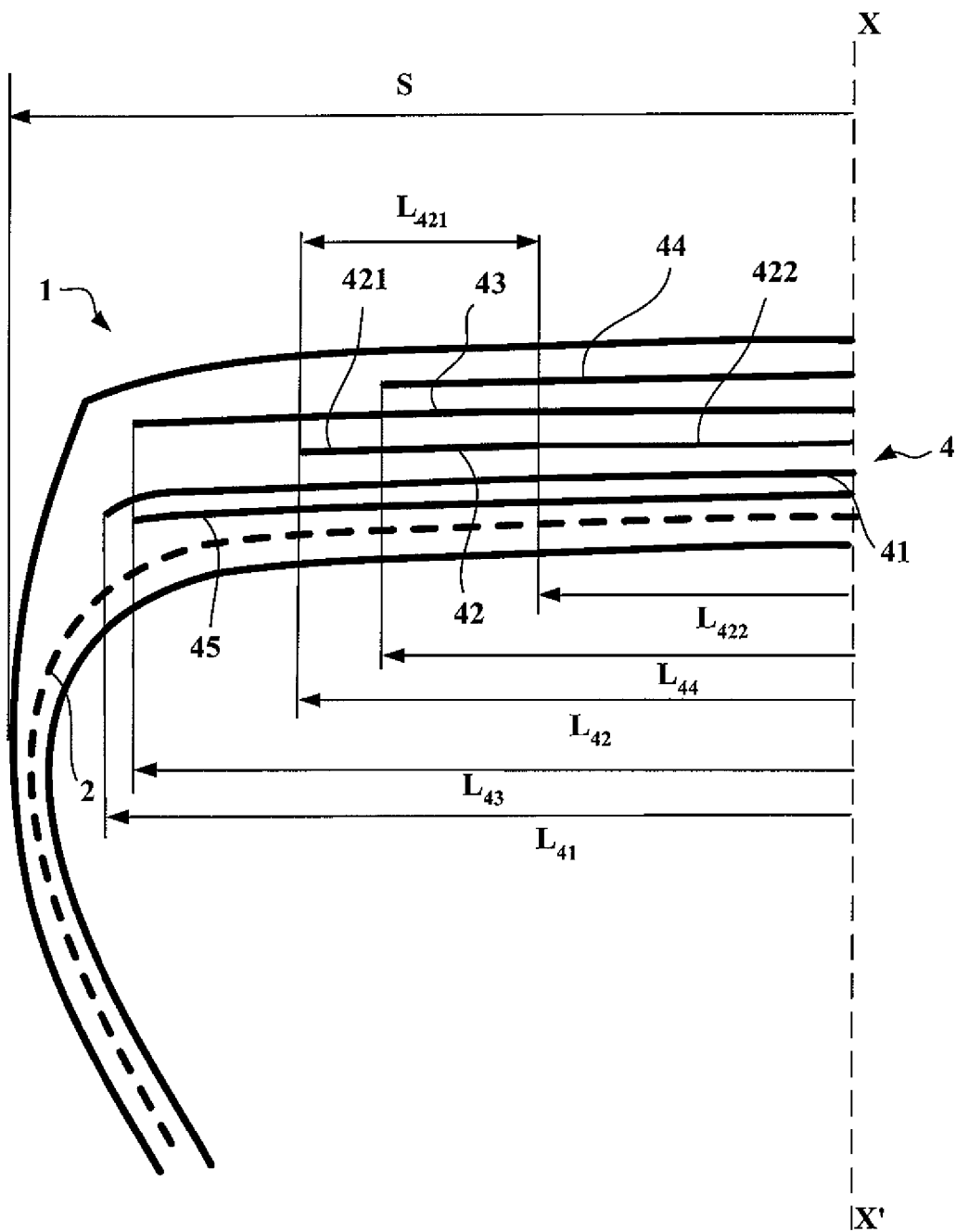
FIG. 4: a meridian view of a diagram of a tire according to a third embodiment of the invention.

In FIG. 4, the tire 1 differs from the one depicted in FIG. 1 in that it comprises an additional layer of reinforcing elements 45, known as bracing elements, of a width substantially equal to that of the working layer 43. The reinforcing elements of this layer 45 make an angle of about 60° with the circumferential direction and are directed in the same direction as the reinforcing elements of the working layer 41. This layer 45 notably contributes to reacting the transverse compressive forces to which all of the reinforcing elements in the crown region of the tire are subjected.

Tests have been conducted on the tire produced according to the invention in accordance with the depiction of FIG. 1 and compared against a reference tire that was identical, but produced with a conventional configuration.

This reference tire comprised a layer of circumferential reinforcing elements consisting of one and the same cord coated with a rubber compound the degree of penetration of which was the same along its entire length.

First endurance tests were conducted by fitting identical vehicles with each of the tires and having each of the vehicles drive a route in a straight line, the tires being subjected to loads in excess of the nominal load in order to accelerate this type of test.

The vehicles were associated with a load per tire of 4000 kg.

Other endurance tests were conducted on a test rig that imposed a load and a side slip angle on the tires. The tests were conducted on the tires according to the invention with the same load and the same side slip angle as those applied to the reference tires.

The tests thus conducted demonstrated that the distances covered in each of these tests was substantially identical for the tires according to the invention and for the reference tires. It would therefore appear that the tires according to the invention have substantially equivalent performance to the reference tires in terms of endurance.

Finally, other running tests were performed on ground unpaved with asphalt with reliefs to simulate the presence of stones particularly harmful to tire treads.

These last tests demonstrated that after covering identical distances, the tires according to the invention displayed less severe damage than the reference tires the damage to which was considered so great as to prohibit further use of the reference tires.

The invention as has just been described particularly with reference to the exemplary embodiments should not be considered to be restricted to these examples. Although it remains within the field of application of the invention, the layer of circumferential reinforcing elements may for example be made up of more than three parts, so that it exhibits a gradual variation in the degree of penetration of the rubber compound in the cord and therefore a gradual variation in the elastic moduli of the circumferential reinforcing elements from the crown of the tires towards the axially exterior ends of the layer of circumferential reinforcing elements.

The invention claimed is:

1. A tire with a radial carcass reinforcement, comprising:
a crown reinforcement formed of at least two working crown layers of inextensible reinforcing elements, crossed from one of said working crown layers to another of said working crown layers making angles of between 10° and 45' with the circumferential direction, said crown reinforcement being radially capped by a tread that is connected to two beads via two sidewalls, said crown reinforcement further comprising at least one layer of circumferential reinforcing elements,
wherein said at least one layer of circumferential reinforcing elements comprises at least one central part between two axially exterior parts,
wherein, via temperature control during vulcanization, the extent to which the circumferential reinforcing elements of said at least one central part are penetrated by a rubber compound with which they are coated is less than the extent to which the circumferential reinforcing elements of the axially exterior parts are penetrated by a rubber compound with which they are coated, and
wherein the circumferential reinforcing elements in said at least one central part and said two axially exterior parts are formed from the same metal cord.

2. The tire according to claim 1, wherein the extent to which the circumferential reinforcing elements of the central part are penetrated by the rubber compound with which they are coated is at least 30% less than the extent to which the circumferential reinforcing elements of the axially exterior parts are penetrated by the rubber compound with which they are coated.

3. The tire according to claim 1, wherein the extent to which the circumferential reinforcing elements of the axially exterior parts are penetrated by the rubber compound with which they are coated is greater than 90%.

4. The tire according to claim 1, wherein the extent to which the circumferential reinforcing elements of the central part are penetrated by the rubber compound with which they are coated is less than 60%.

5. The tire according to claim 1, wherein the elastic modulus of the rubber compound with which the circumferential reinforcing elements of the central part are coated is less than the modulus of the rubber compound with which the circumferential reinforcing elements of the axially exterior parts are coated.

6. The tire according to claim 1, wherein an axial width of the central part of the layer of circumferential reinforcing elements is greater than $0.15 \times S$ and less than $0.5 \times S$, wherein $S$ is the maximum axial width of said tire when said tire is mounted on a service rim and inflated to a recommended pressure.

7. The tire according to claim 1, wherein an axial width of each of the axially exterior parts of the layer of circumferential reinforcing elements is less than $0.45 \times S$, wherein $S$ is the maximum axial width of said tire when said tire is mounted on a service rim and inflated to a recommended pressure.

8. The tire according to claim 1, wherein the layer of circumferential reinforcing elements is positioned radially between two of the at least two working crown layers.

9. The tire according to claim 1, wherein said at least two working crown layers have different axial widths, and wherein the difference between the axial width of the axially widest working crown layer and the axial width of the axially narrowest working crown layer is between 10 and 30 mm.

10. The tire according to claim 9, wherein the axially widest working crown layer is radially on the interior of the axially narrowest working crown layers.

11. The tire according to claim 1, wherein the axial widths of the working crown layers radially adjacent to the layer of circumferential reinforcing elements are greater than the axial width of the layer of circumferential reinforcing elements.

12. The tire according to claim 11, wherein the working crown layers adjacent to the layer of circumferential reinforcing elements are on each side of the equatorial plane and in an immediate axial continuation of the layer of circumferential reinforcing elements coupled over an axial width in order thereafter to be decoupled by profiles of rubber compound at least over a remainder of a width common to the at least two working crown layers.

13. The tire according to claim 1, wherein the reinforcing elements of said at least one layer of circumferential reinforcing elements are metal reinforcing elements with a secant modulus at 0.7% elongation comprised between 10 and 120 GPa and a maximum tangent modulus of less than 150 GPa.

14. The tire according to claim 13, wherein the secant modulus of the reinforcing elements at 0.7% elongation is less than 100 GPa.

15. The tire according to claim 13, wherein the maximum tangent modulus of the reinforcing elements is less than 130.

16. The tire according to claim 1, wherein the reinforcing elements of said at least one layer of circumferential reinforcing elements are metal reinforcing elements having a curve of tensile stress as a function of relative elongation with shallow gradients for short elongations and a substantially constant and steep gradient for higher elongations.

17. The tire according to claim 1, wherein the reinforcing elements of said at least one layer of circumferential reinforcing elements are metal reinforcing elements that are cut in such a way as to form portions of a length shorter than a circumference of the shortest of the at least one layer, but greater than 0.1 times said circumference, the cuts between portions being axially offset from one another, the elastic modulus in tension per unit width of the at least one layer of circumferential reinforcing elements being less than the elastic modulus in tension, measured under the same conditions, of the most extensible working crown layer.

18. The tire according to claim 1, wherein the reinforcing elements of the at least one layer of circumferential reinforcing elements are wavy metal reinforcing elements, a ratio $a/\lambda$ of the amplitude of a wave a to a wavelength $\lambda$ being at most equal to 0.09, the elastic modulus in tension per unit width of the at least one layer of circumferential reinforcing elements being less than the elastic modulus in tension, measured under the same conditions, of the most extensible working crown layer.

19. The tire according to claim 1, wherein the angle formed with the circumferential direction by the reinforcing elements of the at least two working crown layers is less than 30°.

20. The tire according to claim 1, wherein the at least two working crown layers comprise reinforcing elements that are crossed from one layer to the other, making with the circumferential direction angles that vary according to the axial direction.

21. The tire according to claim 1, wherein the crown reinforcement is supplemented radially on the outside by at least one additional ply, known as a protective ply, of elastic reinforcing elements, oriented with respect to the circumferential direction at an angle comprised between 10° and 45° and of the same direction as the angle formed by the inextensible reinforcing elements of a working crown layer from the at least two working crown layers radially adjacent to it.

22. The tire according to claim 1, wherein the crown reinforcement further comprises a bracing layer formed of metal reinforcing elements that make angles greater than 60° with the circumferential direction.

* * * * *